US005221583A

United States Patent [19]

Jahn et al.

[11] Patent Number: 5,221,583

[45] Date of Patent: Jun. 22, 1993

[54] SUPPORT MATERIAL FOR THERMAL DYE TRANSFER

[75] Inventors: Reiner Jahn, Belm; Jurgen Graumann, Wallenhorst; Horst Westfal, Belm, all of Fed. Rep. of Germany

[73] Assignee: Felix Schoeller, Jr. GmbH & Co. KG, Osnabruck, Fed. Rep. of Germany

[21] Appl. No.: 825,639

[22] Filed: Jan. 24, 1992

[30] Foreign Application Priority Data

Feb. 23, 1991 [DE] Fed. Rep. of Germany ....... 4105804

[51] Int. Cl.$^5$ .............................................. B32B 23/08

[52] U.S. Cl. .................................... 428/511; 428/483; 428/516; 503/227; 524/528

[58] Field of Search ....................... 428/914, 516, 483; 503/227; 524/528

[56] References Cited

U.S. PATENT DOCUMENTS 4,935,298 6/1990 Dethlefs et al. .................... 428/511
5,143,904 9/1992 Minato et al. ....................... 428/511

FOREIGN PATENT DOCUMENTS 0407613 1/1990 European Pat. Off. .

*Primary Examiner*—Edith Buffalow
*Attorney, Agent, or Firm*—Lockwood, Alex, FitzGibbon & Cummings

[57] ABSTRACT

A support material for thermal dye transfer processes of a polyolefin coated base paper in which the base paper has a roughness of 4 μm or less and the polyolefin coating is applied to the base paper in an amount of 30 g/m$^2$ or less.

20 Claims, No Drawings

SUPPORT MATERIAL FOR THERMAL DYE TRANSFER

BACKGROUND AND DESCRIPTION OF INVENTION

This invention concerns polyolefin coated support material for thermal dye transfer processes, as well as a process for producing same.

The system of thermal dye transfer (dye diffusion thermal transfer "D2T2") makes it possible to reproduce an electronically generated image in the form of a "hard copy". The principle of thermal dye transfer consists of the fact that a digital image is processed with regard to the primary colors cyan, magenta, yellow and black and is converted to corresponding electric signals. These signals are then relayed to a thermal printer and converted into heat. The influence of heat causes the dye to sublime out of the donor layer of an ink ribbon (ink sheet) that is in contact with the receiving material so that it diffuses into the receiving layer.

A receiving material for thermal dye transfer usually consists of a base with a receiving layer applied to the front side of the base. The base may be a plastic film, e.g. polyester film, or a synthetic or resin-coated paper. The main component of the receiving layer is usually a thermoplastic resin with an affinity for the dye from the ink ribbon, such as polyester or acrylic resins. In addition to a receiving layer, other layers are frequently also applied to the front side of the base, such as barrier layers, separation layers, adhesion layer and protective layers.

High demands are made of a dye receiving material so that when they are met a high color density and image sharpness (line sharpness) in the transferred image should be assured. Various methods of optimizing the dye receiving material are known from the state of the art, e.g. by means of the support material or by applying various functional layers and/or by means of a specific choice and composition of the receiving layer.

U.S. Pat. No. 4,774,224 discloses a receiving material whose polyethylene coated paper base must have a surface roughness (Ra) of at most 7.5 μinch.

In Japanese patent application No. 02 229 082 a receiving material is described whereby the polyethylene coated paper support material has a roughness value in the amount of 8 to 160 μinch.

A disadvantage of both of these receiving materials is that not all polyethylene coated paper bases with the claimed roughness values in the polyethylene surface either below or above 7.5 μinch guarantee good results with regard to the color density and image sharpness of the image transferred.

The present invention is based on the problem of developing a support material for thermal dye transfer processes which should assure a receiving material that will permit the production of images with a high resolution (line sharpness) and color density after application of a receiving layer.

This problem is solved by using a base paper with a surface roughness (Ra) of 4 μm or less and applying a polyethylene coating to it in a maximum amount of 30 g/m² to receive the support material for thermal dye transfer.

It has surprisingly been found that contrary to the claims made in the state of the art, the roughness of the base paper of a support material for thermal dye transfer processes does play a role in determining the quality of the image transmitted later. It has been found that maintaining a base paper roughness of <4 μm and applying the polyolefin coating in an amount of <30 g/m² make it possible to achieve a high color density and resolution (line sharpness) of the transmitted image. This is true not only for high gloss surfaces of the polyolefin coated support material (Ra<0.2 μm), but also for polyethylene surfaces with a greater surface roughness (>0.2 μm).

In a preferred embodiment of this invention, the roughness of the base paper is 2.5 μm or less.

In another preferred embodiment, the amount of polyolefin coating applied is less than 15 g/m².

The polyolefin coating may consist of high density polyethylene (HDPE) and/or low-density polyethylene (LDPE) or polypropylene. In addition, the polyolefin coating may contain pigments such as $TiO_2$ and other additives.

According to this invention, the polyolefin coating contains at least 30% HDPE, preferably 40–80% HDPE.

This invention will be illustrated in greater detail with the help of the following examples.

EXAMPLE 1

In one test series base paper with a weight of 135 g/m² and various surface roughness values was extrusion coated with polyethylene on both sides.

The front side of the base paper was coated with a pigmented polyethylene mixture (32% LDPE with d=0.934 g/m³, MFI=3.0; 42% HDPE with d=0.950 g/cm³, MFI =7; 13.0% $TiO_2$ masterbatch with 50% rutile 2073 and 50% LLDPE, MFI=8.5; 13.0% pregranules of 100 parts LDPE, 17 parts of a 10% ultramarine blue masterbatch, 11 parts of a 0.2% true pink pigment masterbatch and 10 parts stearate) in which the HDPE content percentage was 42 wt %. The mixture was applied in different amounts according to the following scheme:

| | Examples | | | | | | |
|---|---|---|---|---|---|---|---|
| Features | 1a | 1b | 1c | 1d | 1e | 1f | 1g |
| Roughness of the base paper, Ra (μm) | 7 | 4 | 2.5 | 0.5 | 6 | 0.5 | 0.5 |
| Amount of polyethylene coating applied, g/m² | 30 | 30 | 30 | 30 | 12 | 12 | 10 |

A cooling cylinder with a high gloss surface was selected for extrusion coating so that the surface of the polyethylene coated support materials had a roughness (Ra) of 0.15 μm.

In the next step, a receiving layer was applied to the polyethylene coated base paper in an amount of 10 g/m².

The receiving layer was applied from an aqueous suspension with the following composition at a speed of 130 m/min:

| | |
|---|---|
| Acrylate copolymer (Primal HG-44) 40% aqueous dispersion | 41.4 wt % |
| Polyethylene, oxidized (Sudranol 340) 30% aqueous dispersion | 55.2 wt % |
| Fluorine surfactant | 3.4 wt % |

-continued

| |
|---|
| 1% in $H_2O$ |

The receiving material obtained after the subsequent drying (110° C., 10 sec) was printed using the thermal image transfer method and then was analyzed. The results are summarized in Table 1.

EXAMPLE 2

Base paper with a weight of 135 g/$m^2$ and different surface roughness values was coated with polyethylene according to the following scheme:

| | Examples | | | |
|---|---|---|---|---|
| Feature | 2a | 2b | 2c | 2d |
| Roughness of the base paper, Ra (μm) | 4 | 4 | 4 | 0.5 |
| Amount of polyethylene coating applied, (g/$m^2$) | 30 | 15 | 10 | 10 |

The PE coating of the front side was a pigmented polyethylene mixture (21.2% LDPE with d=0.924 g/$cm^3$, MFI 4.5, 50% HDPE with d=0.960 g/$m^3$, MFI=6.0; 15.0% $TiO_2$ masterbatch with 50% rutile 2073 and 50% LLDPE, MFI=8.5; 13.8% pregranules of 100 parts LDPE, 17 parts of a 10% ultramarine masterbatch, 11 parts of a 0.2% true pink pigment masterbatch and 10 parts stearate), in which the HDPE content percentage was 50 wt %.

In the next step a receiving layer was applied to the polyethylene coated base as described in Example 1.

The results of the subsequent analysis of the printed receiving material are summarized in Table 2.

TESTING THE SUPPORT MATERIAL PRODUCED ACCORDING TO EXAMPLES 1 AND 2

The support materials according to this invention which were provided with an image receiving layer were subjected to a thermal image transfer process using a color video printer VY-25E from Hitachi and a Hitachi ink ribbon. The video printer had the following technical specifications:

| | |
|---|---|
| Image memory: | PAL 1-frame memory |
| Printed image: | 64 color pixels<br>540:620 pixels |
| Printing time: | 2 minutes per image |

The color density and line sharpness of the resulting print image (hard copy) were analyzed.

The density measurements were performed with the help of a densitometer (Original Reflection Densitometer SOS-45). The measurements were performed for the primary colors cyan, magenta, yellow and black.

The line sharpness was determined on the basis of test patterns printed in the primary colors. The test pattern shows straight lines printed both horizontally and vertically. The measurement is performed with a line counter at three measurement points. Then the arithmetic mean is calculated. The smaller the measured value of the line width, the greater is the sharpness of the image.

In addition to the measurements described above, the printed images were also evaluated visually and irregularities on the surfaces of the image, such as white spots or so-called missing dots (no dye uptake), were used to evaluate the image quality.

The results summarized in Tables 1 and 2 show that an image receiving material that has a higher color density and image sharpness of the printed images in comparison with the traditional receiving material can be produced with the support material according to this invention.

TABLE 1

| | Properties of the Printed Image Receiving Material of Example 1. | | | | | | | | |
|---|---|---|---|---|---|---|---|---|---|
| | Color Density, d | | | | Line Sharpness, mm | | | | Printed |
| Example | cyan | magenta | yellow | black | cyan | magenta | yellow | black | Image |
| 1a | 1.58 | 1.45 | 1.49 | 1.78 | 0.4 | 0.4 | 0.4 | 0.4 | poor, a few missing dots |
| 1b | 1.72 | 1.51 | 1.58 | 1.80 | 0.4 | 0.4 | 0.4 | 0.4 | good |
| 1c | 1.74 | 1.53 | 1.62 | 1.84 | 0.4 | 0.3 | 0.3 | 0.4 | good |
| 1d | 1.82 | 1.56 | 1.59 | 1.86 | 0.3 | 0.3 | 0.3 | 0.4 | good |
| 1e | 1.62 | 1.50 | 1.52 | 1.80 | 0.4 | 0.4 | 0.4 | 0.4 | very poor, many missing dots |
| 1f | 1.96 | 1.62 | 1.74 | 1.96 | 0.3 | 0.3 | 0.3 | 0.3 | good |
| 1g | 1.89 | 1.58 | 1.70 | 1.92 | 0.3 | 0.3 | 0.3 | 0.3 | good |

TABLE 2

| | Properties of the Printed Receiving Material of Example 2. | | | | | | | | |
|---|---|---|---|---|---|---|---|---|---|
| | Color Density, d | | | | Line Sharpness, mm | | | | Printed |
| Example | cyan | magenta | yellow | black | cyan | magenta | yellow | black | Image |
| 2a | 1.75 | 1.53 | 1.63 | 1.83 | 0.4 | 0.4 | 0.4 | 0.4 | good |
| 2b | 1.83 | 1.57 | 1.62 | 1.89 | 0.3 | 0.3 | 0.3 | 0.4 | good |
| 2c | 1.87 | 1.58 | 1.61 | 1.96 | 0.3 | 0.3 | 0.3 | 0.3 | good |
| 2d | 2.01 | 1.62 | 1.75 | 1.93 | 0.3 | 0.3 | 0.3 | 0.3 | very good |

We claim:

1. A support material for thermal dye transfer processes comprising a base material and a polyolefin coating on the side of the base material to which the dye is to be thermally transferred, wherein the roughness (Ra) of the base material is 4 μm or less and the polyolefin coating contains at least 30% HDPE and is 30 g/$m^2$ or less.

2. The support material of claim 1, wherein the roughness of the base material is 2.5 μm or less.

3. The support material of claim 1, wherein the polyolefin coating is a polyethylene coating in an amount of less than 15 $g/m^2$.

4. The support material of claim 2, wherein the polyolefin coating is a polyethylene coating in an amount of less than 15 $g/m^2$.

5. The support material of claim 1, wherein the polyolefin coating contains 40–80% HDPE.

6. The support material of claim 1, wherein the polyolefin coating also contains pigments.

7. The support material of claim 6, wherein the pigment is titanium dioxide.

8. The support material of claim 1, wherein said base material is paper.

9. The support material of claim 2, wherein said base material is paper.

10. The support material of claim 3, wherein said base material is paper.

11. A process for producing a support material for thermal dye transfer on a polyolefin coated base material, comprising applying the polyolefin coating to the base material on the side of the base material to which the dye is to be thermally transferred, said polyolefin coating containing at least 30% HDPE and being applied in an amount of 30 $g/m^2$ or less to said base material, and said base material having a surface roughness (Ra) of 4 $\mu m$ or less.

12. The process of claim 11, wherein the roughness of the base material is 2.5 $\mu m$ or less.

13. The process of claim 11, wherein the polyolefin coating is a polyethylene coating in an amount of less than 15 $g/m^2$.

14. The process of claim 12, wherein the polyolefin coating is a polyethylene coating in an amount of less than 15 $g/m^2$.

15. The process of claim 11, wherein the polyolefin coating also contains titanium dioxide.

16. The process of claim 12, wherein the polyolefin coating also contains titanium dioxide.

17. The process of claim 13, wherein the polyolefin coating also contains titanium dioxide.

18. The support material of claim 11, wherein said base material is paper.

19. The support material of claim 12, wherein said base material is paper.

20. The support material of claim 13, wherein said base material is paper.

* * * * *